United States Patent
Sakai et al.

(10) Patent No.: US 7,664,148 B2
(45) Date of Patent: Feb. 16, 2010

(54) PASSIVE Q SWITCH LASER DEVICE

(75) Inventors: Hiroshi Sakai, Hamamatsu (JP);
Hirofumi Kan, Hamamatsu (JP);
Takunori Taira, Okazaki (JP)

(73) Assignees: National Institutes of Natural Sciences, Tokyo (JP); Hamamatsu-Photonics K.K., Shizuoka (JP)

( * ) Notice: Subject to any disclaimer, the term of this patent is extended or adjusted under 35 U.S.C. 154(b) by 0 days.

(21) Appl. No.: 11/661,327

(22) PCT Filed: Sep. 6, 2005

(86) PCT No.: PCT/JP2005/016315

§ 371 (c)(1),
(2), (4) Date: Mar. 14, 2008

(87) PCT Pub. No.: WO2006/028078

PCT Pub. Date: Mar. 16, 2006

(65) Prior Publication Data
US 2009/0016385 A1    Jan. 15, 2009

(30) Foreign Application Priority Data
Sep. 6, 2004    (JP)    ............................ 2004-258947

(51) Int. Cl.
H01S 3/11    (2006.01)
H01S 3/113    (2006.01)
(52) U.S. Cl. .......................................... 372/10; 372/11
(58) Field of Classification Search .................. 372/10, 372/11
See application file for complete search history.

(56) References Cited

U.S. PATENT DOCUMENTS 6,804,272 B2 *    10/2004    O'Gorman et al. ............ 372/30

OTHER PUBLICATIONS

V. Kir'yanov, "Influence of passive shutter Cr4+:YAG nonlinear absorption anisotropy on output ergy and polarization state of neodymium laser at passive Q-switching," Lasers and Electro Optics, EO/pacific rim '97 pacific rim conference, 1997, pp. 154-155.*

(Continued)

*Primary Examiner*—Armando Rodriguez
(74) *Attorney, Agent, or Firm*—Drinker Biddle & Reath LLP

(57)    ABSTRACT

A laser apparatus 10 includes: a laser medium 11 arranged between a pair of reflecting means 12A and 12B of an optical resonator 12 and adapted to be excited to emit light; a saturable absorber 14 arranged on the optical axis L of the optical resonator 12 between the pair of reflecting means, the transmissivity thereof being adapted to increase with the absorption of emitted light 21 from the laser medium; and an excitation light source unit 13 adapted to output light 22 having a wavelength that excites the laser medium. The saturable absorber 14 is a crystalline body having first to third mutually perpendicular crystallographic axes and is arranged in the optical resonator 12 in such a manner as to have different transmissivities for emitted light in two mutually perpendicular polarization directions. In this case, a laser oscillation occurs for emitted light in the polarization direction that shows the greater transmissivity, and it is therefore possible to obtain laser beams having a stabilized polarization direction.

7 Claims, 15 Drawing Sheets

OTHER PUBLICATIONS

N. N. Il'ichev, Nonlinear Absorption Anisotropy in YAG:V3+, QELS'96, QWE29 p. 133-134, 1996.*

A. V. Kir'yanov, "Influence of passive shutter $Cr^{4+}$:YAG nonlinear absorption anisotropy on output energy and polarization state of neodymium laser at passive Q-switching," Lasers and Electro Optics, CLEO/pacific rim '97 pacific rim conference, 1997, pp. 154-155.

J. Dong et al., "LD Pumped $Cr^{4+}$, $Nd^{3+}$:YAG with Self-q-switched Laser Output of 1.4 W," Chinese Journal of Lasers, vol. A28, No. 6, Jun. 2001, pp. 484-486 (including English-language Abstract).

S. J. Bepko, "Anisotropy of two-photon absorption in GaAs and CdTe," Physical Review B, vol. 12, No. 2, Jul. 15, 1975, pp. 669-672.

A. V. Kir'yanov et al., "Enhancing type-II optical second-harmonic generation by the use of a laser beam with a rotating azimuth of polarization," Applied Physics Letters, Feb. 12, 2001, vol. 78, No. 7, pp. 874-876.

A. V. Kir'yanov et al., "Second-harmonic generation by $Nd^{3+}$:YAG/$Cr^{4+}$:YAG-laser pulses with changing state of polarization," J. Opt. Soc. Am. B, Oct. 2000, vol. 17, No. 10, pp. 1657-1664.

A. V. Kir'yanov et al., "SHG by a $Nd^{3+}$:YAG/$Cr^{4+}$:YAG laser pulse with changing-in-time polarization," Advanced Solid-State Lasers, 2002, vol. 68, pp. 88-92.

N. N. Il'ichev et al., "An Influence of Passive Shutter $Cr^{4+}$:YAG Latent Anisotropy on Output Energy and Polarisation Characteristics of Neodymium Laser at Passive Q-Switching," OSA TOPS vol. 10 Advanced Solid State Lasers, 1997, pp. 137-140.

* cited by examiner

*Fig.12*
(a)
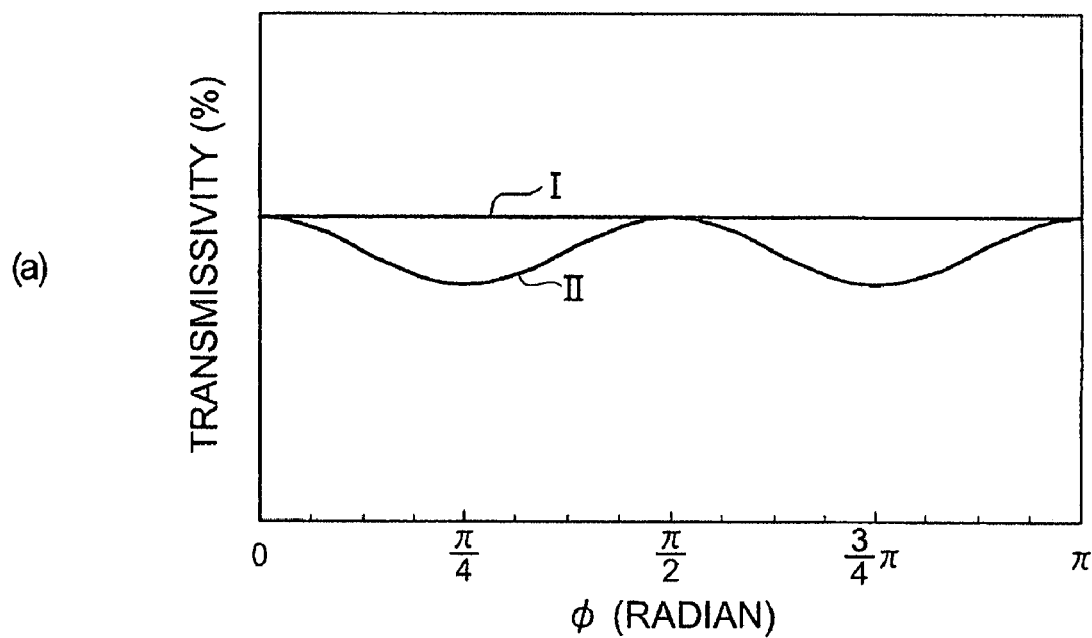
(b)
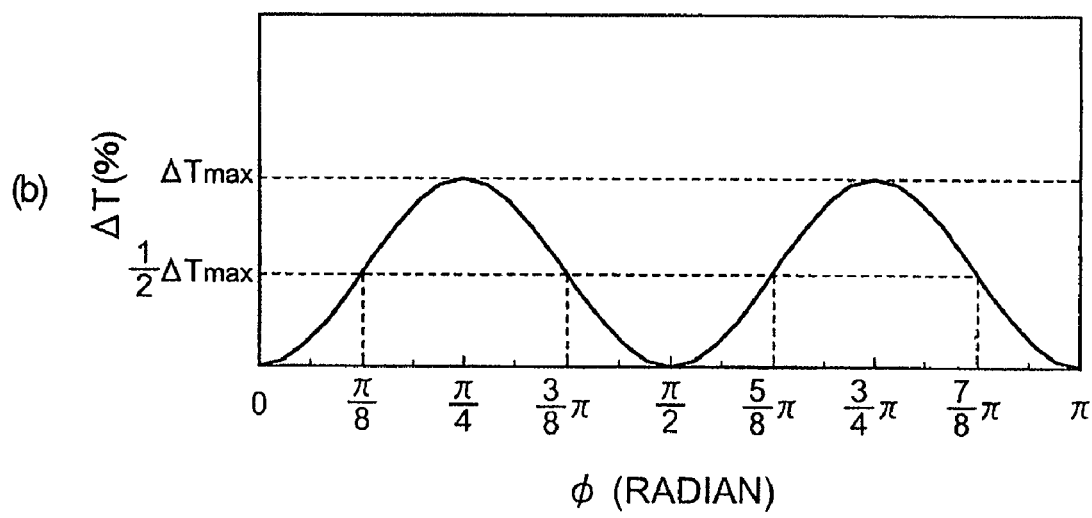

Fig.13
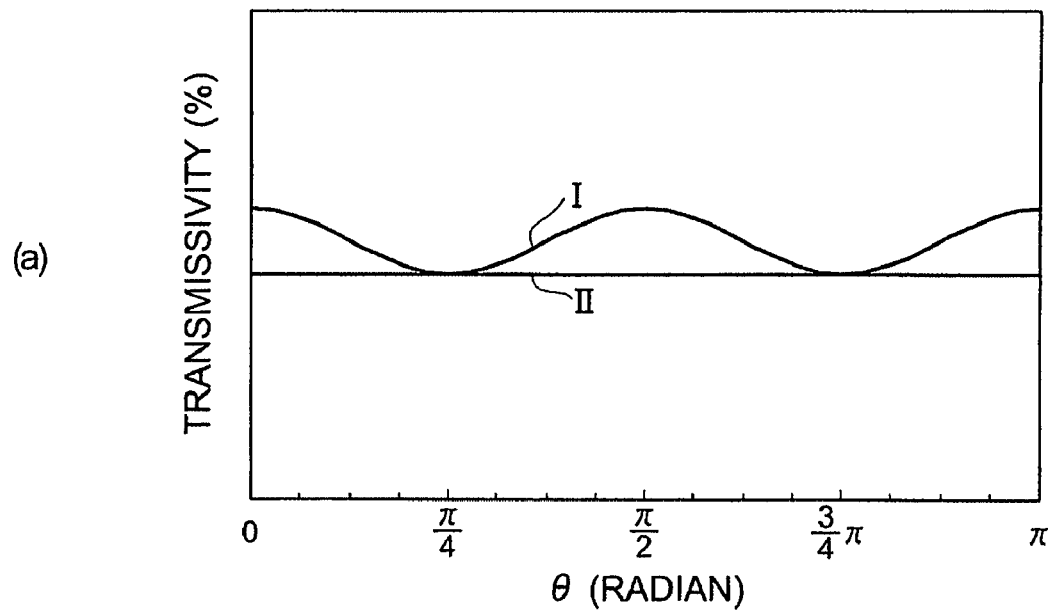
(a)
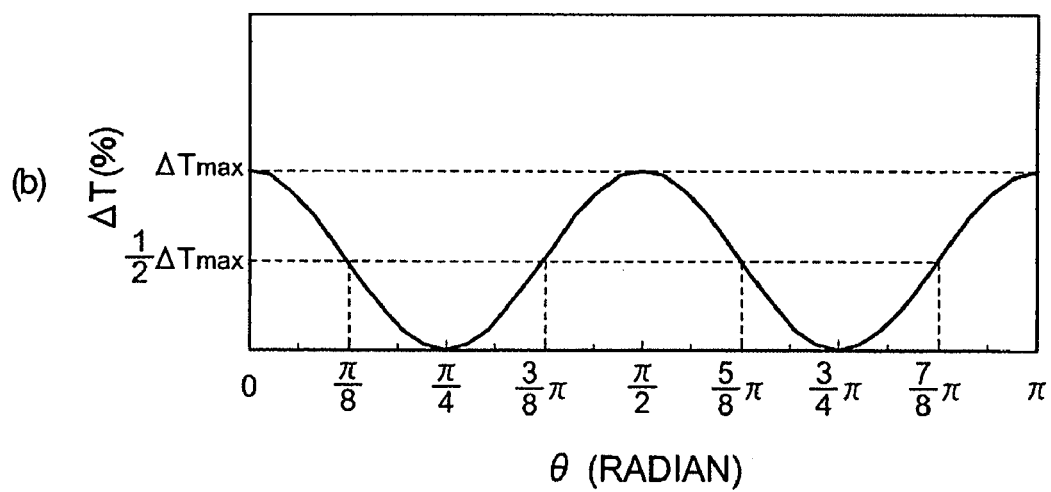
(b)

PASSIVE Q SWITCH LASER DEVICE

TECHNICAL FIELD

The present invention relates to a passively Q-switched laser apparatus.

BACKGROUND ART

Passively Q-switched laser apparatuses (hereinafter referred to simply as "laser apparatuses") are for generating pulse light and utilized in spectroscopic measurements, geometrical measurements, and nonlinear crystal excitations, etc. In such laser apparatuses, a saturable absorber is arranged together with a laser medium between a pair of mirrors (reflecting means) that constitute an optical resonator. In this arrangement, when light emitted from the laser medium being excited enters the saturable absorber, the emitted light is absorbed by the saturable absorber. The electron density in the excited level of the saturable absorber increases gradually with the absorption of the emitted light, and when the excited level is filled up, i.e., the electron density in the excited level is saturated at some point in time, the saturable absorber becomes transparent. At this time, the Q-value of the optical resonator increases drastically to result in a laser oscillation and thereby generating pulse light.

Meanwhile, it is desirable that the polarization direction of laser beams from such laser apparatuses is controlled and stabilized for wavelength conversions using nonlinear optical crystals and linear polarization based geometrical measurements, etc. As a method for controlling the polarization direction of laser beams, there have been proposed techniques in which a polarizing element is arranged between a laser medium and a saturable absorber (refer to Non-Patent Documents 1 to 3, for example).

Non-Patent Document 1: A. V. Kir' yanov and V. Aboites, "Enhancing type-II optical second-harmonic generation by the use of a laser beam with a rotating azimuth of polarization", APPLIED PHYSICS LETTERS, 12 Feb. 2001, Vol. 78, No. 7, pp. 874-876.

Non-Patent Document 2: Alexander V. Kir' yanov and Vicente Aboites, "Second-harmonic generation by Nd3+:YAG/Cr4+:YAG-laser pulses with changing state of polarization", J. Opt. Soc. Am. B, October 2000, Vol. 17, No. 10, pp. 1657-1664.

Non-Patent Document 3: A. V. Kir' yanov, J. J. Soto-Bernal, and V. J. Pinto-Robledo, "SHG by a Nd3+:YAG/Cr4+:YAG laser pulse with changing-in-time polarization", Advanced Solid-State Lasers, 2002, Vol. 68, pp. 88-92.

DISCLOSURE OF THE INVENTION

Problem to be Solved by the Invention

However, arranging a polarizing element in an optical resonator as in the conventional manner suffers from a problem in that the length of the optical resonator is increased, resulting in an increase in the pulse width to cause a reduction in peak power and/or in a difficulty in reducing the size thereof.

Hence, an object of the present invention is to provide a small-sized passively Q-switched laser apparatus capable of outputting pulse laser beams having a stabilized polarization direction while limiting the reduction in peak intensity.

Means for Solving the Problem

In order to solve the above-described problem, the present invention is directed to a passively Q-switched laser apparatus including: a laser medium arranged between a pair of reflecting means that constitute an optical resonator and adapted to be excited to emit light; a saturable absorber arranged on the optical axis of the optical resonator between the pair of reflecting means, the transmissivity thereof being adapted to increase with the absorption of light emitted from the laser medium; and an excitation light source unit adapted to output light having a wavelength that excites the laser medium, in which the saturable absorber is a crystalline body having first to third mutually perpendicular crystallographic axes and is arranged in the optical resonator in such a manner as to have different transmissivities for light in two mutually perpendicular polarization directions emitted from the laser medium.

In the case above, when the laser medium is excited by light output from the excitation light source unit, the laser medium emits light and the saturable absorber is excited by absorbing the light emitted from the laser medium. The transmissivity of the saturable absorber increases as the electron density in the excited level increases with the absorption of the emitted light, and then the saturable absorber becomes almost transparent when the excited level is filled up. As a result, the emitted light resonates in the optical resonator to result in a laser oscillation and thereby outputting pulse laser beams.

Then, in the arrangement above, since the saturable absorber as a crystalline body having first to third crystallographic axes is arranged in the optical resonator in such a manner as to have different transmissivities for emitted light in mutually perpendicular polarization directions, a laser oscillation will occur for emitted light in the polarization direction that shows the greater transmissivity. That is, since the saturable absorber controls the polarization direction, laser beams having a stabilized polarization direction will be generated. In this case, there is no need to arrange other components for controlling the polarization direction (e.g. polarizing element) in the optical resonator, which allows the length of the optical resonator to be reduced. As a result, it is possible to limit the reduction in pulse peak intensity due to an increased length of the optical resonator as well as to achieve size reduction.

Also, in the passively Q-switched laser apparatus according to the present invention, first and second angles $\theta$ and $\phi$ preferably satisfy the following respective formulae (1) and (2), provided that $\theta$ represents the angle between the first crystallographic axis of the saturable absorber and the optical axis of the optical resonator, while $\phi$ represents the angle between a projection of the optical axis on the plane including the second and third crystallographic axes and the second crystallographic axis:

$$\pi/2(m-\xi) \leq \theta \leq \pi/2(m+\xi) \tag{1}$$

$$\pi/2(m+\xi+1/4) \leq \phi \leq \pi/2(m-\xi+3/4) \tag{2}$$

where m=0, 1, 2, 3, and $\xi$ satisfies the following formula (3):

$$0 \leq \xi \leq 1/4 \tag{3}$$

In the case above, since the first and second angles $\theta$ and $\phi$ satisfy the respective formulae (1) and (2), the difference between the transmissivities of the saturable absorber for emitted light in the two mutually perpendicular polarization directions tends to increase. As a result, the polarization direction can be controlled more reliably, and it is therefore possible to output laser beams having a more stabilized polarization direction.

Also, in the passively Q-switched laser apparatus according to the present invention, it is preferable that the first angle $\theta$ equal $\pi/2$ and the second angle $\phi$ equal $\pi/4$. In this case, only the first crystallographic axis is included in a plane that is approximately perpendicular to the optical axis. Since the transmissivity tends to increase for emitted light in the polarization direction parallel to each crystallographic axis, it is possible to stably generate laser beams having a polarization direction approximately parallel to the first crystallographic axis in this case.

Further, in the passively Q-switched laser apparatus according to the present invention, it is preferable that the saturable absorber be made of $Cr^{4+}$:YAG crystal, and the first, second, and third crystallographic axes correspond, respectively, to the <001>, <100>, and <010> axes.

$Cr^{4+}$:YAG crystal has an anisotropic structure and the first to third crystallographic axes are made correspondent, respectively, to the <001>, <100>, and <010> axes, whereby there occurs a difference in transmissivity for emitted light in the mutually perpendicular polarization directions. As a result, it is possible to output laser beams having a stabilized polarization direction. In particular, if $\phi$ equals $\pi/4$ and $\theta$ equals $\pi/2$, emitted light enters the saturable absorber along the <110> direction. In this case, the difference between the transmissivities for emitted light in the mutually perpendicular polarization directions tends to be maximized, and it is therefore possible to reliably stabilize the polarization direction of laser beams output from the passively Q-switched laser apparatus.

Furthermore, in the passively Q-switched laser apparatus according to the present invention, it is preferable that the saturable absorber be made of $V^{3+}$:YAG crystal, and the first, second, and third crystallographic axes correspond, respectively, to the <001>, <100>, and <010> axes.

$V^{3+}$:YAG crystal has an anisotropic structure and the first to third crystallographic axes are made correspondent, respectively, to the <001>, <100>, and <010> axes, whereby there occurs a difference in transmissivity for emitted light in the mutually perpendicular polarization directions. As a result, it is possible to output laser beams having a stabilized polarization direction. In particular, if $\phi$ equals $\pi/4$ and $\theta$ equals $\pi/2$, emitted light enters the saturable absorber along the <110> direction. In this case, the difference between the transmissivities for emitted light in the mutually perpendicular polarization directions tends to be maximized, and it is therefore possible to reliably stabilize the polarization direction of laser beams output from the passively Q-switched laser apparatus.

In addition, the saturable absorber in the passively Q-switched laser apparatus according to the present invention may be made of GaAs.

Effect of the Invention

In accordance with the passively Q-switched laser apparatus according to the present invention, it is possible to achieve size reduction as well as to output pulse laser beams having a stabilized polarization direction while limiting the reduction in peak intensity.

BRIEF DESCRIPTION OF THE DRAWINGS

FIG. 12 is a view showing the dependence of the transmissivity on polarization direction for $\phi$ when $\theta$ equals $\pi/2$;

FIG. 13 is a view showing the dependence of the transmissivity on polarization direction for $\theta$ when $\phi$ equals $\pi/4$;

DESCRIPTION OF SYMBOLS

10: Laser apparatus (passively Q-switched laser apparatus)
11: $Nd^{3+}$:YAG crystal (laser medium)
12A and 12B: Mirrors (a pair of reflecting means)
12: Optical resonator
13: Excitation light source unit
14: $Cr^{4+}$:YAG crystal
21: Emitted light
22: Exciting light (light having a wavelength that excites the laser medium)
23: Laser beam output from the laser apparatus
L: Optical axis
L1: Projection of the optical axis L

BEST MODE FOR CARRYING OUT THE INVENTION

Preferred embodiments of a passively Q-switched laser apparatus according to the present invention will hereinafter be described with reference to the accompanying drawings.

Figure 1:
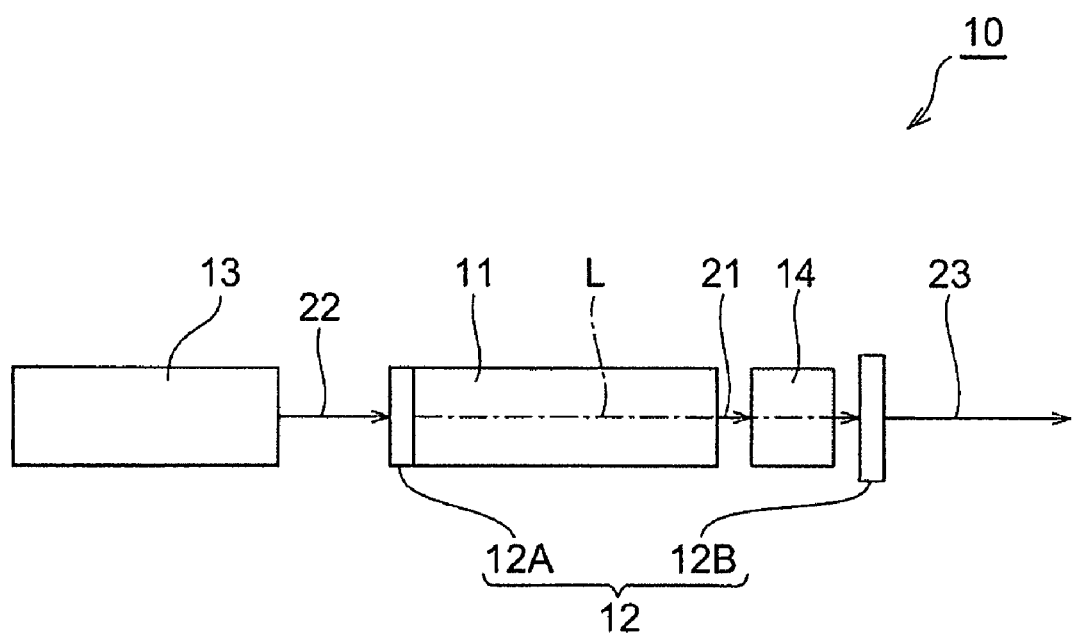
FIG. 1 is a schematic view showing the configuration of a passively Q-switched laser apparatus according to an embodiment of the present invention.

As shown in FIG. 1, the passively Q-switched laser apparatus (hereinafter referred to simply as "laser apparatus") 10 has Nd:YAG crystal 11 as a laser medium. The $Nd^{3+}$:YAG crystal 11 can be excited by light having a wavelength of around 808 nm and emit light having a wavelength of about 1064 nm due to a transition from an upper level to a lower level. The wavelengths each may include an error of ±10 nm for their specific wavelengths. It is noted that in the following descriptions, light emitted from the $Nd^{3+}$:YAG crystal 11 will be referred to as emitted light 21.

The $Nd^{3+}$:YAG crystal 11 is arranged in an optical resonator 12 and the optical resonator 12 is composed of a pair of mirrors (reflecting means) 12A and 12B facing each other. Then, the mirror 12A is transparent to light having a wavelength of about 808 nm and is adapted to reflect light having a wavelength of about 1064 nm at a high reflectivity, while the mirror 12B is partially transparent to light having a wavelength of about 1064 nm and is adapted to reflect the rest of the light. It is noted that the mirror 12A may be a dielectric multilayer film formed on an end face of the $Nd^{3+}$:YAG crystal 11.

An excitation light source unit 13 adapted to output light (exciting light) 22 having a wavelength of about 808 nm to excite the $Nd^{3+}$:YAG crystal 11 is provided outside the optical resonator 12. The excitation light source unit 13 is composed of, for example, a semiconductor laser element adapted to output exciting light 22 having a wavelength of about 808 nm and a lens system for making the exciting light 22 incident to the $Nd^{3+}$:YAG crystal 11 through the mirror 12A. It is noted that the excitation light source unit 13 is assumed to have a semiconductor laser element, but it is only required to output light having a wavelength that can excite the $Nd^{3+}$:YAG crystal 11 without being limited to semiconductor laser elements necessarily, and also the lens system may be omitted as long as the exciting light 22 from the excitation light source unit 13 can be made incident to the $Nd^{3+}$:YAG crystal 11.

The laser apparatus 10 further has $Cr^{4+}$:YAG crystal 14 as a saturable absorber to achieve Q switching. The $Cr^{4+}$:YAG crystal 14 is a cubic crystalline body having mutually perpendicular <001> axis (first crystallographic axis), <100> axis (second crystallographic axis), and <010> axis (third crystallographic axis) and has an anisotropic structure.

The $Cr^{4+}$:YAG crystal 14 is arranged on the optical axis L of the optical resonator 12 between the $Nd^{3+}$:YAG crystal 11 and the mirror 12B in such a manner that the <001> axis is approximately perpendicular to the optical axis L and the <110> direction is approximately parallel to the optical axis L. It is noted that "approximately" means that the angular difference is within ±10 degrees.

Figure 2:
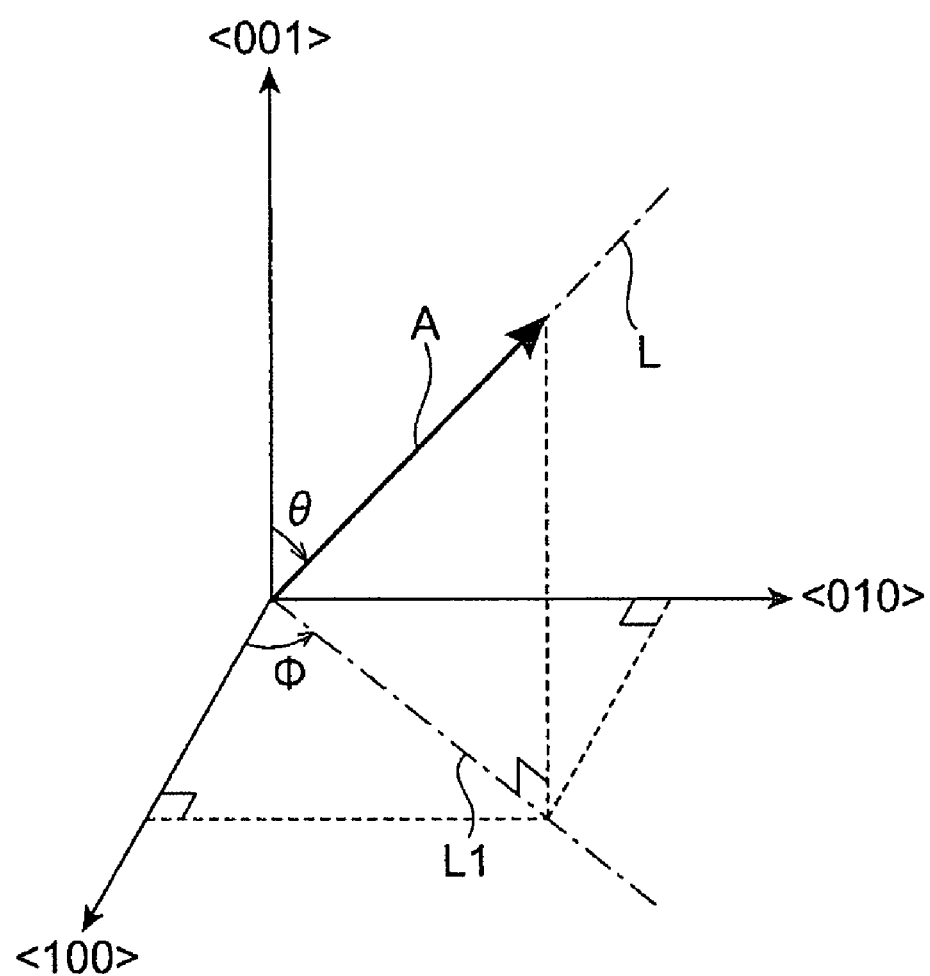
FIG. 2 is a schematic view showing the positional relationship between the crystallographic axes of $Cr^{4+}$:YAG crystal and an optical axis.

That is, as shown in FIG. 2, first and second angles θ and φ equal, respectively, π/2 and π/4, provided that θ represents the angle between the optical axis L and the <001> axis, while φ represents the angle between a projection L1 of the optical axis L on the plane including the <100> and <010> axes (<100><010> plane) and the <100> axis. In the optical resonator 12, since the emitted light 21 from the $Nd^{3+}$:YAG crystal 11 travels mainly along the optical axis L of the optical resonator 12, the direction of the optical axis L corresponds to the incident direction of the emitted light 21 from the $Nd^{3+}$:YAG crystal 11 into the $Cr^{4+}$:YAG crystal 14 (the direction indicated by the arrow A in the drawing).

The transmissivity of the $Cr^{4+}$:YAG crystal 14 increases with the absorption of the emitted light 21 output from the $Nd^{3+}$:YAG crystal 11 when made incident thereto, and then the $Cr^{4+}$:YAG crystal 14 becomes transparent when the electron density in the excited level increases to fill the excited level up. This causes the Q-value of the optical resonator 12 to increase to result in a laser oscillation.

Next will be described the operation of the laser apparatus 10. As shown in FIG. 1, when the exciting light 22 having a wavelength of about 808 nm is output from the excitation light source unit 13, the exciting light 22 enters the $Nd^{3+}$:YAG crystal 11 through the mirror 12A and excites the $Nd^{3+}$:YAG crystal 11 to cause an inverted population. Then, when the emitted light 21 having a wavelength of about 1064 nm is emitted due to a transition from an upper level to a lower level in the excited $Nd^{3+}$:YAG crystal 11, the emitted light 21 enters the $Cr^{4+}$:YAG crystal 14 to be absorbed therein. When the electron density in the excited level of the $Cr^{4+}$:YAG crystal 14 increases to be saturated with the absorption, the $Cr^{4+}$:YAG crystal 14 becomes transparent and thereby the Q-value of the optical resonator 12 increases to result in a laser oscillation. Then, laser beams 23 having a wavelength of about 1064 nm are output from the mirror 12B.

In the laser apparatus 10, it is important to arrange the $Cr^{4+}$:YAG crystal 14 in the optical resonator 12 in the above-described positional relationship so that the emitted light 21 is made incident along the <110> direction. That is, making the emitted light 21 incident along the <110> direction of the $Cr^{4+}$:YAG crystal 14 allows laser beams 23 having a stabilized polarization direction to be output. Thus, the laser apparatus 10 is suitably applicable for linear polarization based on geometrical measurements of aerosol and wavelength conversions using the excitation of nonlinear optical crystals, etc.

Here will be described the stability of the polarization direction of laser beams 23 output from the laser apparatus 10 with reference to FIGS. 3 and 4.

Figure 3:
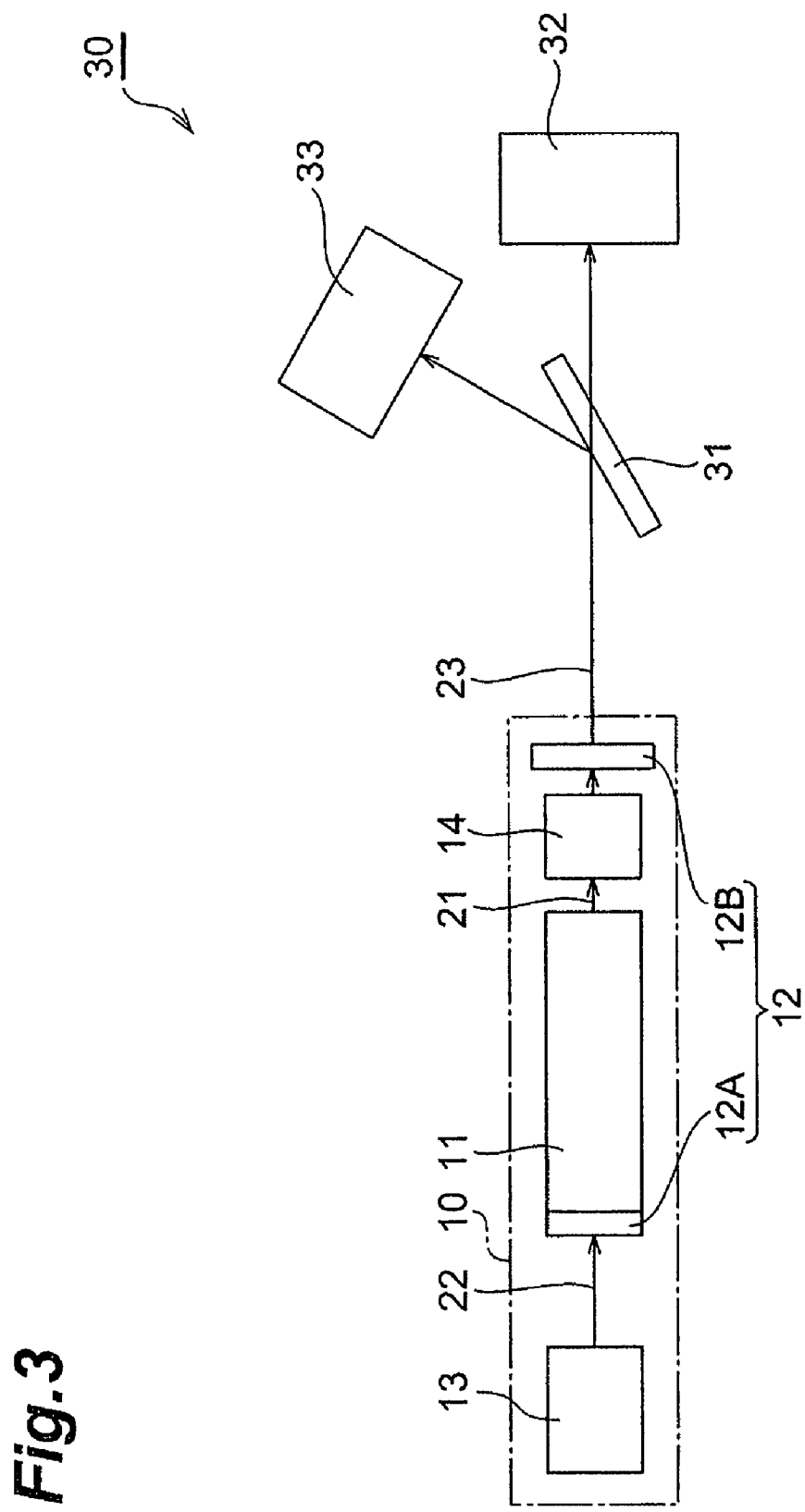
FIG. 3 is a schematic view showing the configuration of a measurement system for measuring the polarization characteristics of laser beams from the laser apparatus shown in FIG. 1.

FIG. 3 is a schematic view of a measurement system 30 for examining the stability of the polarization direction of laser beams 23 output from the laser apparatus 10. The measurement system 30 has the laser apparatus 10, a polarization beam splitter 31, and power meters 32 and 33. The polarization beam splitter 31 is arranged on the optical path of laser beams 23 output from the laser apparatus 10 and is adapted to divide the laser beams 23 into P- and S-polarized components. Then, the power meter 32 is adapted to receive and measure the intensity of P-polarized component light divided through the polarization beam splitter 31, while the power meter 33 is adapted to receive and measure the intensity of S-polarized component light. It is noted that in the measurements, the temperature in the optical resonator 12 shall be changed from 25 to 40 degrees Celsius so that the polarization direction of the emitted light 21 can be changed easily through an alignment shift.

Figure 4:
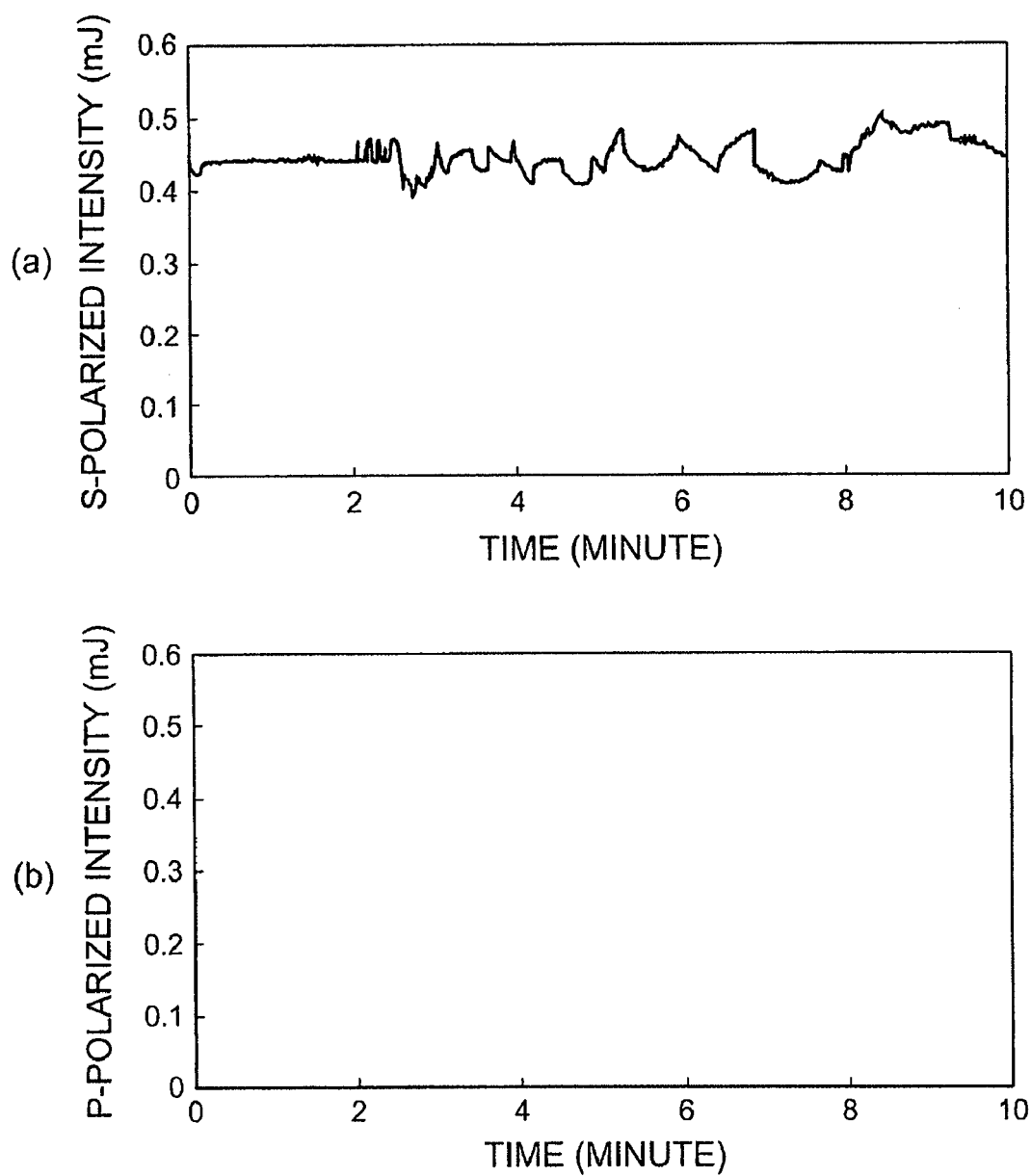
FIG. 4 is a view showing the polarization characteristics of laser beams from the laser apparatus shown in FIG. 1, where FIG. 4(*a*) shows a measurement result of the intensity of the S-polarized component of laser beams in which the horizontal axis represents the time (minute) from the start of the measurement while the vertical axis represents the intensity of the S-polarized component (pulse energy (mJ)) and FIG. 4(*b*) shows a measurement result of the intensity of the P-polarized component of laser beams in which the horizontal axis represents the time (minute) from the start of the measurement while the vertical axis represents the intensity of the P-polarized component (pulse energy (mJ))

FIG. 4 is a view showing the polarization characteristics of laser beams 23 measured by the measurement system 30, where FIG. 4(a) shows a measurement result of the intensity of the S-polarized component of laser beams 23 in which the horizontal axis represents the time (minute) from the start of the measurement while the vertical axis represents the intensity of the S-polarized component (pulse energy (mJ)) and FIG. 4(b) shows a measurement result of the intensity of the P-polarized component of laser beams 23 in which the horizontal axis represents the time (minute) from the start of the measurement while the vertical axis represents the intensity of the P-polarized component (pulse energy (mJ)).

As shown in FIGS. 4(a) and 4(b), even though the polarization direction of the emitted light 21 can be changed easily due to the temperature change in the optical resonator 12, the laser apparatus 10 outputs only S-polarized laser beams 23, achieving stabilized polarization characteristics. The pulse energy of the P-polarized component in this case is five-hundredth or less, and preferably one-thousandth or less of that of the S-polarized component.

For the sake of comparison, here will be described the polarization characteristics of laser beams output when the emitted light 21 is made incident along the <100> axis of the $Cr^{4+}$:YAG crystal 14 as employed in conventional passively Q-switched laser apparatuses. In this case, the measurement system 30 for obtaining the polarization characteristics is the same as shown in FIG. 3. However, the $Cr^{4+}$:YAG crystal 14 is arranged in the optical resonator 12 in such a manner that the <100> axis is parallel to the optical axis L and that the incident direction of the emitted light 21 from the $Nd^{3+}$:YAG crystal 11 into the $Cr^{4+}$:YAG crystal 14 is parallel to the <100> axis.

Figure 5:
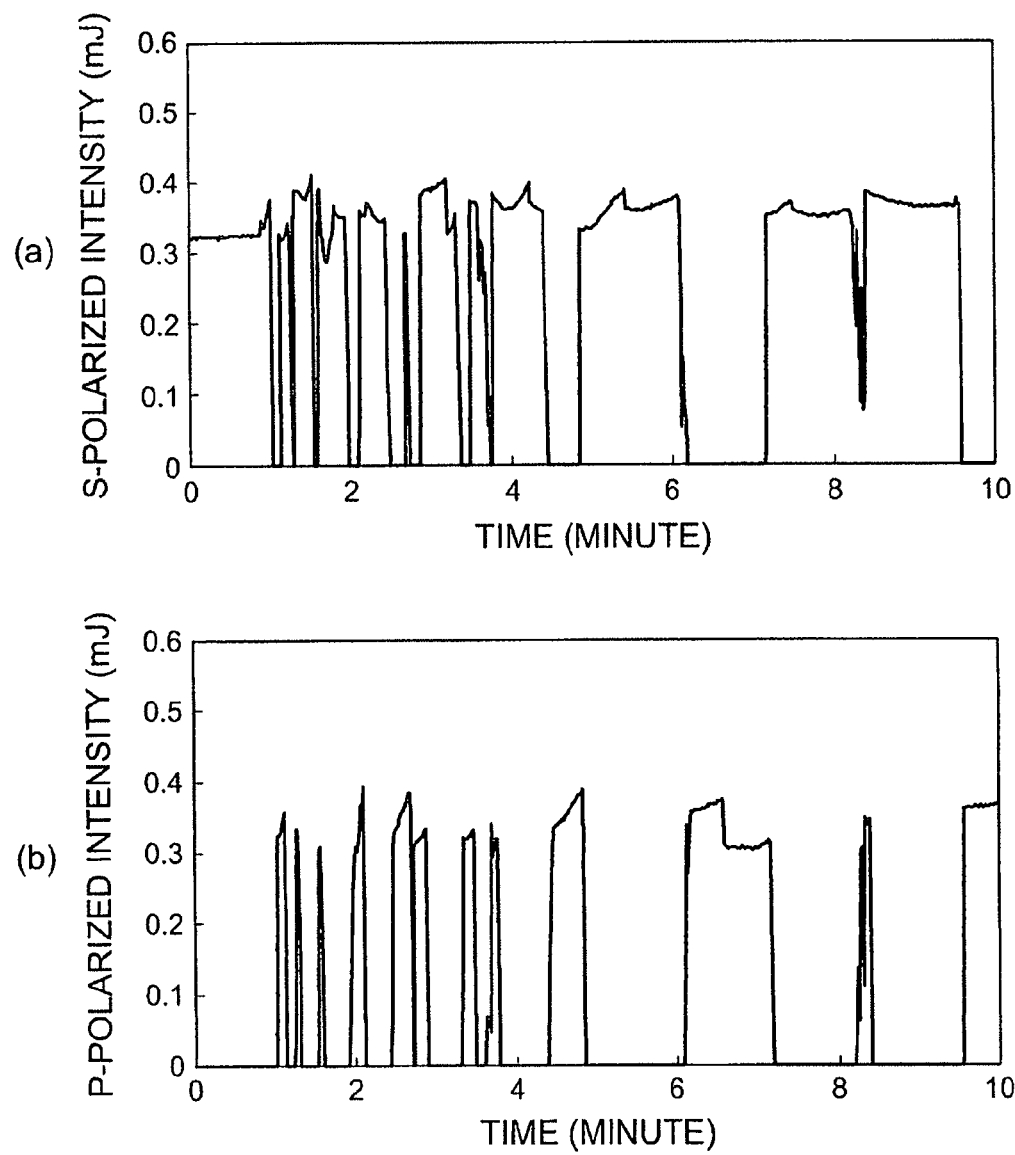
FIG. 5 is a view showing the polarization characteristics of laser beams from a conventional passively Q-switched laser apparatus, where FIG. 5(*a*) shows a measurement result of the intensity of the S-polarized component in which the horizontal axis represents the time (minute) from the start of the measurement while the vertical axis represents the intensity of the S-polarized component (pulse energy (mJ)) and FIG. 5(*b*) shows a measurement result of the intensity of the P-polarized component in which the horizontal axis represents the time (minute) from the start of the measurement while the vertical axis represents the intensity of the P-polarized component (pulse energy (mJ))

FIG. 5 is a view showing the polarization characteristics of laser beams in the case above, where FIG. 5(*a*) shows a measurement result of the intensity of the S-polarized component and FIG. 5(*b*) shows a measurement result of the intensity of the P-polarized component. It is noted that the horizontal and vertical axes in FIGS. 5(*a*) and 5(*b*) represent the same as in FIGS. 4(*a*) and 4(*b*). As shown in FIGS. 5(*a*) and 5(*b*), S- and P-polarized laser beams are output alternately in this case and the polarization state of the laser beams is not stabilized.

Therefore, as is clear from the comparison between FIGS. 4 and 5, the laser apparatus 10 can generate laser beams 23 having an extremely stabilized polarization direction as mentioned above by making the <110> direction of the $Cr^{4+}$:YAG crystal 14 parallel to the optical axis L and making the emitted light 21 incident in the <110> direction.

Next will be described the reason that the polarization direction of the laser beams 23 can be stabilized by making the emitted light 21 incident in the <110> direction. In order to stabilize the polarization direction of the laser beams 23, the present inventors focused on the dependence of the transmissivity of the $Cr^{4+}$:YAG crystal 14 on the polarization direction.

Figure 6:
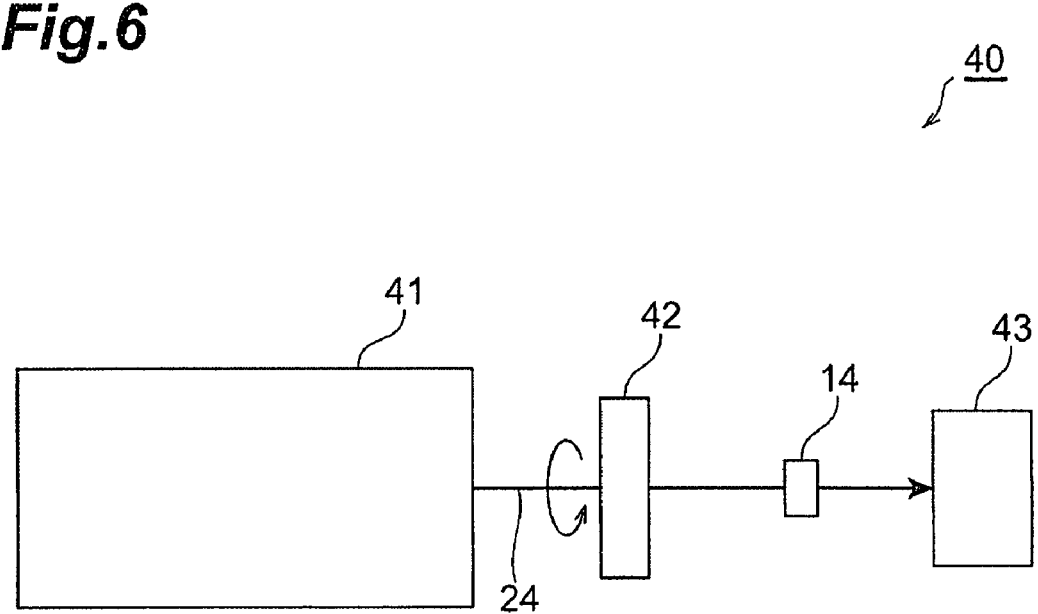
FIG. 6 is a schematic view showing the configuration of a measurement system for measuring the dependence of the transmissivity of $Cr^{4+}$:YAG crystal on polarization direction.

FIG. 6 is a schematic view showing the configuration of a measurement system 40 for measuring the dependence of the transmissivity of the $Cr^{4+}$:YAG crystal 14 on polarization direction.

The measurement system 40 employs a continuously oscillating YAG laser light source 41 with a stabilized polarization direction. Then, laser beams 24 output from the YAG laser light source 41 are made incident to the $Cr^{4+}$:YAG crystal 14 through a ½-wavelength plate 42 and the intensity of baser beams 24 transmitting through the $Cr^{4+}$:YAG crystal 14 is measured using a power meter 43. The polarization direction of light incident to the $Cr^{4+}$:YAG crystal 14 is rotated through the ½-wavelength plate 42. Then, the intensity of incident light is measured preliminarily with the $Cr^{4+}$:YAG crystal 14 being not disposed, and then the transmissivity is obtained by dividing the intensity of laser beams 24 transmitting through the $Cr^{4+}$:YAG crystal 14 by the preliminarily measured light intensity. It is noted that the <001> axis of the $Cr^{4+}$:YAG crystal 14 is arranged to be approximately perpendicular to a level block (not shown in the drawing) for placing the components of the measurement system 40 thereon.

Figure 7:
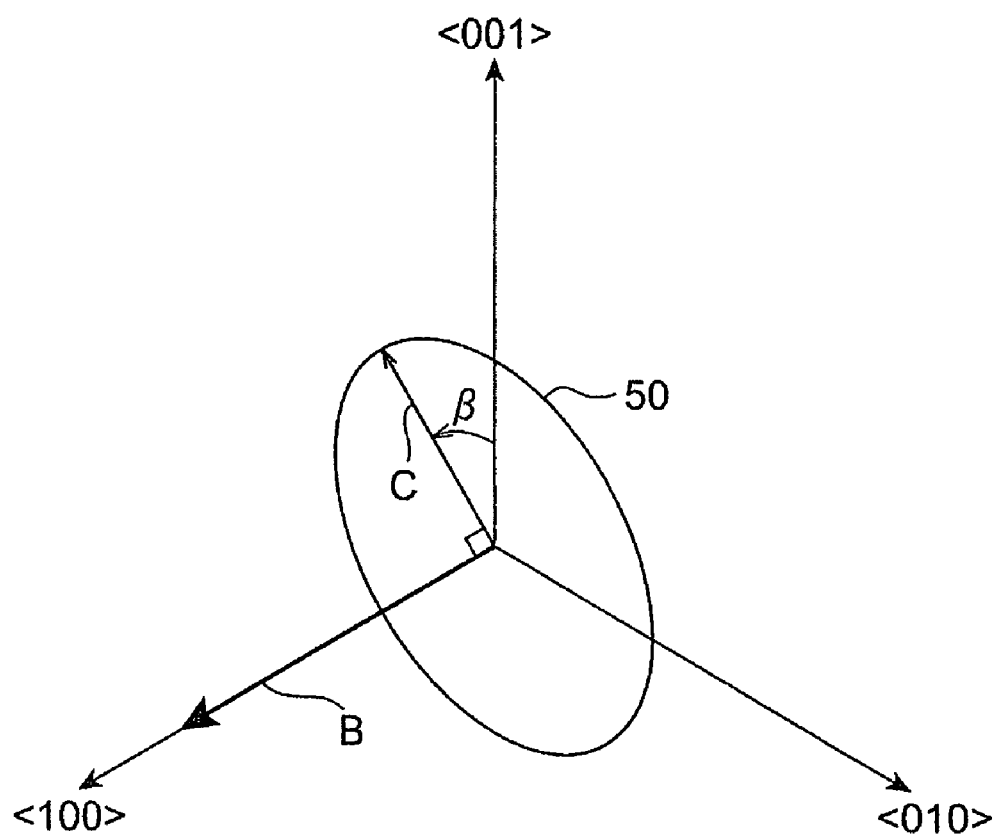
FIG. 7 is a schematic view showing the positional relationship between the incident direction of laser beams into $Cr^{4+}$:YAG crystal and the crystallographic axes.

First will be described the case where the laser beams 24 are made incident along the <100> axis of the $Cr^{4+}$:YAG crystal 14, correspondingly to conventional laser apparatuses. FIG. 7 is a schematic view showing the relationship between the incident direction of the laser beams 24 from the YAG laser light source 41 into the $Cr^{4+}$:YAG crystal (indicated by the arrow B in the drawing) as well as the polarization direction of the laser beams 24 (indicated by the arrow C in the drawing) and the crystallographic axes. In FIG. 7, the plane 50 including the polarized components of the laser beams 24 as incident light (hereinafter referred to as polarization plane) is indicated by a circle and the polarization plane 50 is perpendicular to the incident direction B. Also, the angle between the <001> axis and the polarization direction C is defined as a third angle β. In this measurement, rotating the ½-wavelength plate 42 (refer to FIG. 6) corresponds to rotating the polarization direction C in the polarization plane 50 (i.e. changing β from 0 to 2π).

Figure 8:
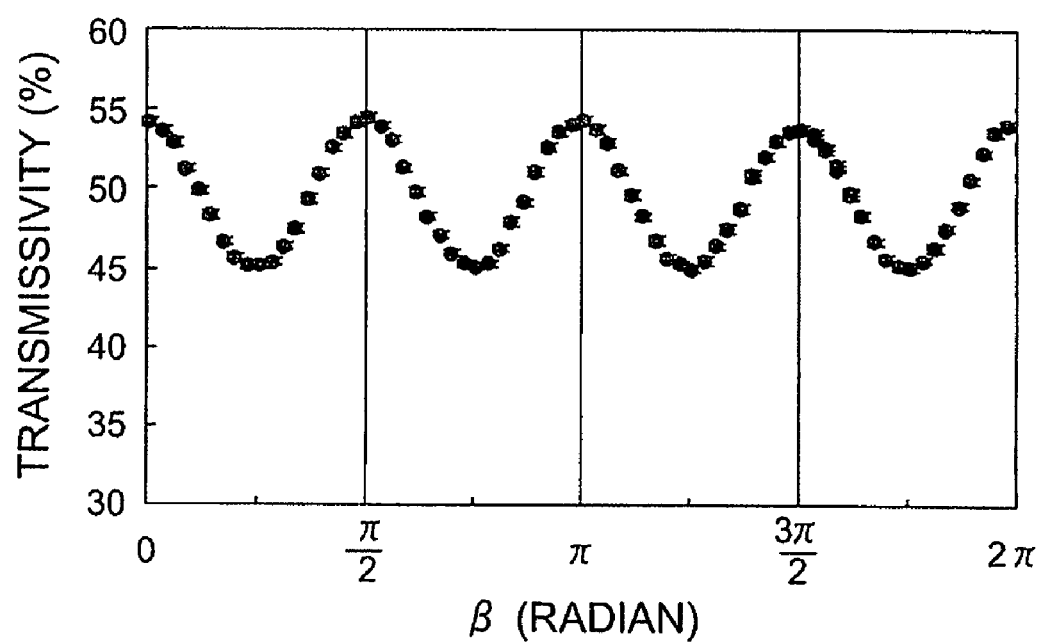
FIG. 8 is a view showing the dependence of the transmissivity on polarization direction when laser beams are made incident along the <100> axis.

FIG. 8 shows a measurement result of the transmissivity when the laser beams 24 are made incident along the <100> axis of the $Cr^{4+}$:YAG crystal 14, where the horizontal axis represents the third angle β (radian) and the vertical axis represents the transmissivity (%). It is noted that β=0 and π/2 correspond to the respective cases where the polarization direction C is parallel to the <001> and <010> axes. As shown in FIG. 8, peaks of approximately the same transmissivity occur for every π/2 shift of β, that is, when the polarization direction C is made approximately parallel to the <001> or <010> axis.

Therefore, when the <100> axis of the $Cr^{4+}$:YAG crystal 14 is arranged parallel to the optical axis L of the optical resonator 12 so that the emitted light 21 is made incident along the <100> axis as employed in conventional laser apparatuses, a laser oscillation is likely to occur if the polarization direction of the emitted light 21 is parallel to the <001> and <010> axes. Then, since the transmissivities for the emitted light 21 in the polarization directions parallel to the respective axes are approximately the same as each other, laser oscillations occur similarly for the emitted light 21 in both the polarization directions C. Consequently, the polarization direction of output laser beams changes in accordance with the change in the polarization direction C of the emitted light 21 due to an alignment shift, etc., resulting in the results shown in FIG. 5.

Figure 9:
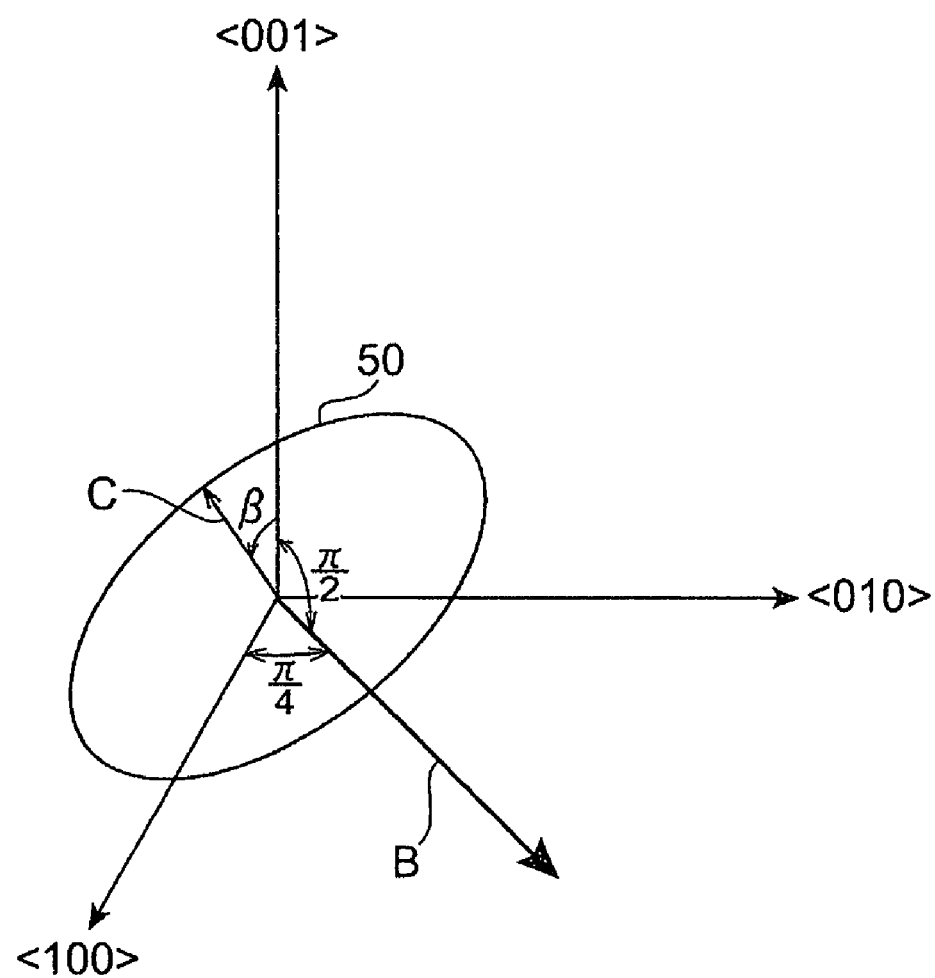
FIG. 9 is a schematic view showing the positional relationship between the incident direction of laser beams into $Cr^{4+}$:YAG crystal and the crystallographic axes.
Figure 10:
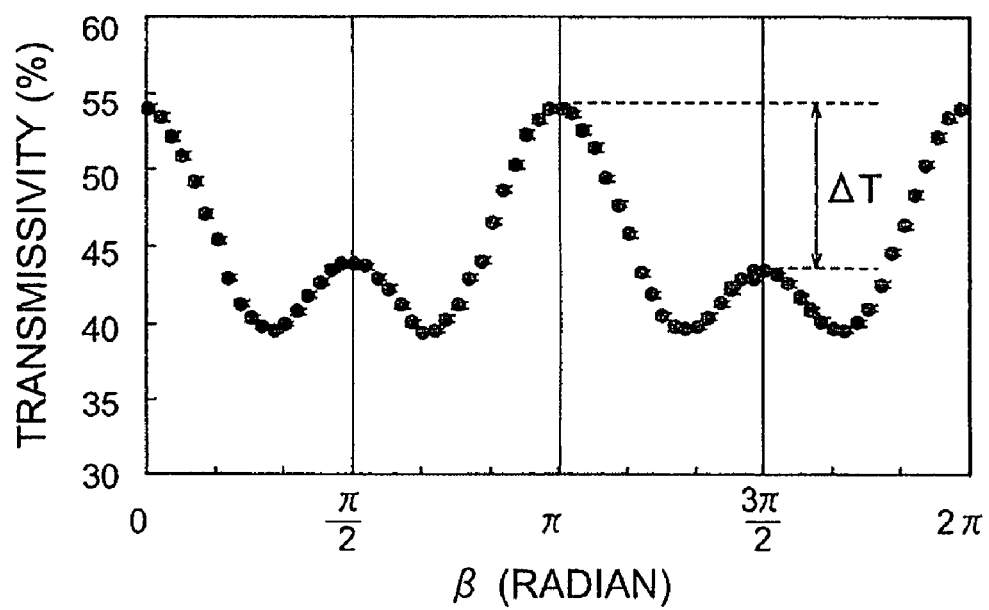
FIG. 10 is a view showing the dependence of the transmissivity on polarization direction when laser beams are made incident along the <110> direction.

On the contrary, here will be described the case where the laser beams 24 are made incident in the <110> direction of the $Cr^{4+}$:YAG crystal 14 as employed in the laser apparatus 10. FIG. 9 is a schematic view showing the relationship between the incident direction B of the laser beams 24 from the YAG laser light source 41 into the $Cr^{4+}$:YAG crystal 14 as well as the polarization direction C and the crystallographic axes. It is noted that the third angle β is the angle between the polarization direction C and the <001> axis, as is the case in FIG. 7. FIG. 10 shows a measurement result of the transmissivity in this case.

As shown in FIG. 10, transmissivity peaks occur for every π/2 shift of the third angle β. However, since the polarization plane 50 includes only one crystallographic axis (i.e. <001> axis) as shown in FIG. 9, there occurs a difference of ΔT between the transmissivity when the polarization direction C is parallel to the <001> axis (i.e. β=0) and the transmissivity when the polarization direction C is rotated by π/2 from the position parallel to the <001> axis (i.e. β=π/2). Therefore, incorporating the $Cr^{4+}$:YAG crystal 14 into the laser apparatus 10 in such a manner as to have the difference ΔT allows the laser oscillation to be controlled so as to occur for light in the polarization direction C that shows the greater transmissivity.

Then, as mentioned above, since the emitted light 21 (refer to FIG. 1) is made incident in the <110> direction of the $Cr^{4+}$:YAG crystal 14 in the laser apparatus 10, there occurs a difference of ΔT, as shown in FIG. 10, between the transmissivities of the $Cr^{4+}$:YAG crystal 14 for the emitted light 21 in the mutually perpendicular polarization directions. It is noted that ΔT is about 10% here. The difference ΔT allows for a laser oscillation in the laser apparatus 10 only for the case of the polarization direction C that shows the greater transmissivity even if the polarization direction C of the emitted light 21 may change. It is therefore possible to obtain laser beams 23 having a stabilized polarization direction as shown in FIG. 4.

As described heretofore, the $Cr^{4+}$:YAG crystal 14 has functions as a Q-switched element and as an element for controlling the polarization direction in the laser apparatus 10. Therefore, there is no need to further arrange, for example, a polarizing element in the optical resonator 12 to control the polarization direction, which allows the distance between the mirrors 12A and 12B of the optical resonator 12 to be reduced. This reduces the pulse width and it is therefore possible to generate pulse light having high peak intensity while stabilizing the polarization direction.

Then, since the polarization direction can be controlled by the $Cr^{4+}$:YAG crystal 14, it is also possible to make the $Nd^{3+}$:YAG crystal 11 and the $Cr^{4+}$:YAG crystal 14 composite while controlling the polarization direction. As a result, a high-performance microchip laser may be achieved that can output laser beams having a stabilized polarization direction. In addition, since there is no need to further arrange, for example, a polarizing element to control the polarization direction as mentioned above, it is also possible to achieve cost reduction.

Meanwhile, the emitted light 21 is made incident in the <110> direction of the $Cr^{4+}$:YAG crystal 14 in the laser apparatus 10 shown in FIG. 1, but the relationship is not restricted to this case. Since the polarization direction and laser oscillation can be controlled by the difference ΔT as mentioned above, it is only required that the $Cr^{4+}$:YAG crystal 14 is arranged with respect to the optical resonator 12 in such a manner that there occurs a transmissivity difference ΔT for the emitted light 21 in the two mutually perpendicular polarization directions. As an arrangement of the $Cr^{4+}$:YAG crystal 14 with respect to the optical resonator 12 in this case, the first and second angles θ and φ shown in FIG. 2 preferably satisfy the following respective formulae (4) and (5):

$$\pi/2(m-\xi) \leq \theta \leq \pi/2(m+\xi) \tag{4}$$

$$\pi/2(m+\xi+1/4) \leq \phi \leq \pi/2(m-\xi+3/4) \tag{5}$$

where m=0, 1, 2, 3, and ξ satisfies the following formula (6):

$$0 \leq \xi \leq 1/4 \tag{6}$$

Figure 11:
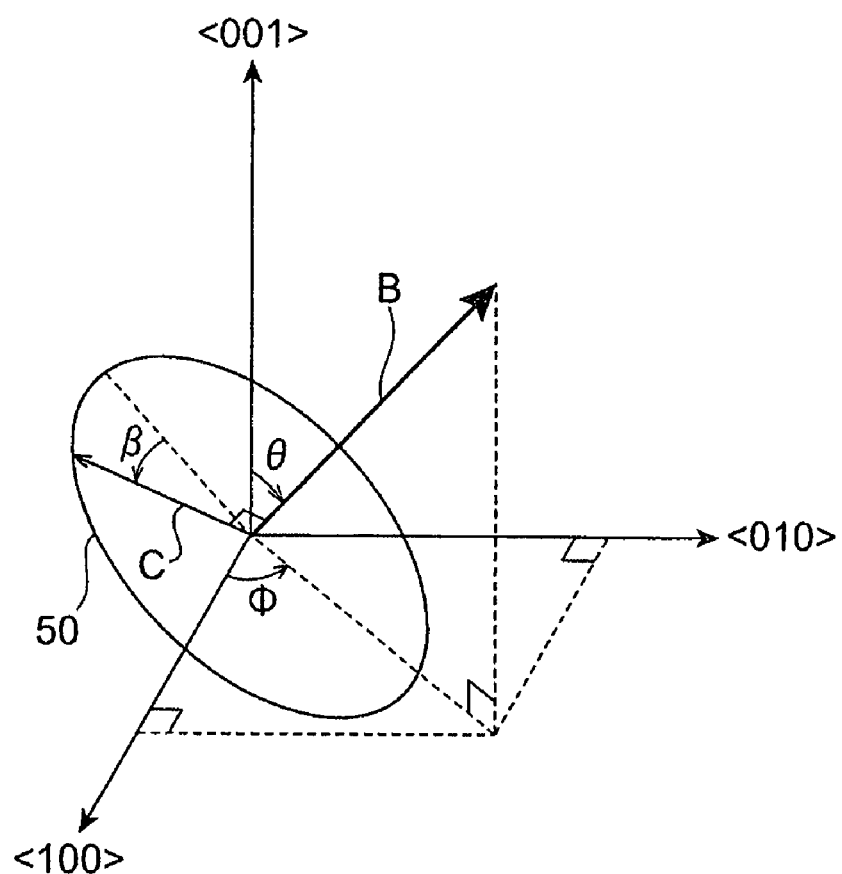
FIG. 11 is a schematic view showing the positional relationship between the incident direction of laser beams into $Cr^{4+}$:YAG crystal and the crystallographic axes.

The reason that it is preferable to satisfy the formulae (4) and (5) above is as follows. Here will also be described based on the dependence of the transmissivity of the $Cr^{4+}$:YAG crystal 14 on polarization direction. The measurement system for measuring the dependence of the transmissivity on the polarization direction is the same as the measurement system 40 shown in FIG. 6. FIG. 11 is a schematic view showing the relationship between the incident direction B of the laser beams 24 as incident light (refer to FIG. 6) into the $Cr^{4+}$:YAG crystal 14 as well as the polarization direction C and the crystallographic axes. It is noted that in FIG. 11, the third angle β is the angle between the planes including the incident direction B and <001> axis and the polarization direction C.

First will be considered the case where θ=π/2, that is, the incident direction B of the laser beams 24 into the $Cr^{4+}$:YAG crystal 14 lies in the <100><010> plane. Here, the transmissivities when the polarization direction C of the laser beams 24 satisfies β=0 and π/2 change for the second angle φ as shown in FIG. 12(a). In FIG. 12(a), the horizontal axis represents the second angle φ (radian) and the vertical axis represents the transmissivity (%). Also, the straight line I shows the case of β=0 and the curved line II shows the case of β=π/2. The difference ΔT between the transmissivities in this case is as shown in FIG. 12(b). In FIG. 12(b), the horizontal axis represents the second angle φ (radian) and the vertical axis represents the difference ΔT (%).

Based on FIG. 12(b), the difference ΔT is maximized in the following case:

$$\phi = \pi/2(m+1/2) \tag{7}$$

Where m=0, 1, 2, 3; the same applies below.

Here, assuming that the range for compensating alignment shifts is equal to or greater than half of the maximum value $\Delta T_{MAX}$ of the difference ΔT, the range of the second angle φ for ensuring a transmissivity difference ΔT that can be used to control the polarization direction is as follows:

$$\pi/2(m+1/4) \leq \phi \leq \pi/2(m+3/4) \tag{8}$$

Next will be considered the case where φ=π/4 (fixed), that is, the incident direction B lies in the plane including the <001> axis and <110> direction, i.e., <001><110> plane. In this case, the transmissivities when the polarization direction C of the laser beams 24 satisfies β=0 and π/2 change for the first angle θ as shown in FIG. 13(a). In FIG. 13(a), the horizontal axis represents the first angle θ (radian) and the vertical axis represents the transmissivity (%). Also, the straight line I shows the case of β=0 and the curved line II shows the case of β=π/2, as is the case in FIG. 12(a). The difference ΔT between the transmissivities in this case is as shown in FIG. 13(b). In FIG. 13(b), the horizontal axis represents the first angle θ (radian) and the vertical axis represents the difference ΔT (%).

Based on FIG. 13(b), the difference ΔT is maximized in the following case:

$$\theta = \pi m/2 \tag{9}$$

Also in this case, assuming that the range for compensating alignment shifts is equal to or greater than half of the maximum value $\Delta T_{MAX}$ of the difference ΔT, the range of the first angle θ for ensuring a transmissivity difference ΔT that can be used to control the polarization direction is as follows:

$$\pi/2(m-1/4) \leq \theta \leq \pi/2(m+1/4) \tag{10}$$

The formula (8) is for the case θ is fixed to π/2, while the formula (10) is for the case φ is fixed to π/4. As shown in FIGS. 12 and 13, the angular difference between the cases where the difference ΔT is the maximum ($\Delta T_{MAX}$) and half thereof ((1/2) $\Delta T_{MAX}$) is π/8. Hence, assuming that the first and second angles θ and φ are changeable up to π/8 in the formulae (8) and (10), the range of difference ΔT within which the polarization direction can be controlled corresponds to the case where the formulae (4) and (5) are both satisfied.

Therefore, arranging the $Cr^{4+}$:YAG crystal 14 with respect to the optical resonator 12 within a range where the formulae (4) and (5) are both satisfied allows the polarization direction to be controlled by the difference ΔT even if the polarization direction C of the emitted light 21 may change. Consequently, the polarization direction of the laser beams 23 (refer to FIG. 1) is stabilized. It is noted that arranging the <110> direction of the $Cr^{4+}$:YAG crystal 14 along the optical axis L of the optical resonator 12 corresponds to the case where θ equals π/2 and φ equals π/4 in the formulae (4) and (5). In this case, the difference ΔT is maximized based on the results shown in FIGS. 12 and 13, which allows the polarization direction of the laser beams 23 to be controlled reliably.

Although the preferred embodiment of the present invention has heretofore been described, the present invention is not restricted to the embodiment. For example, although the $Cr^{4+}$:YAG crystal 14 is used as a saturable absorber, $V^{3+}$:YAG crystal having the same crystalline structure may be used. Further, GaAs may be used as a saturable absorber. Also in these cases, when the saturable absorber is arranged in such a manner that there occurs a transmissivity difference $\Delta T$ for the mutually perpendicular polarization directions of light incident to the saturable absorber, the polarization direction of output laser beams can be controlled and stabilized. Also, in this case, it is preferable to arrange the saturable absorber in the optical resonator 12 in such a manner as to satisfy the formulae (4) and (5), and it is further preferable to make light incident in the <110> direction of the saturable absorber.

Figure 14:
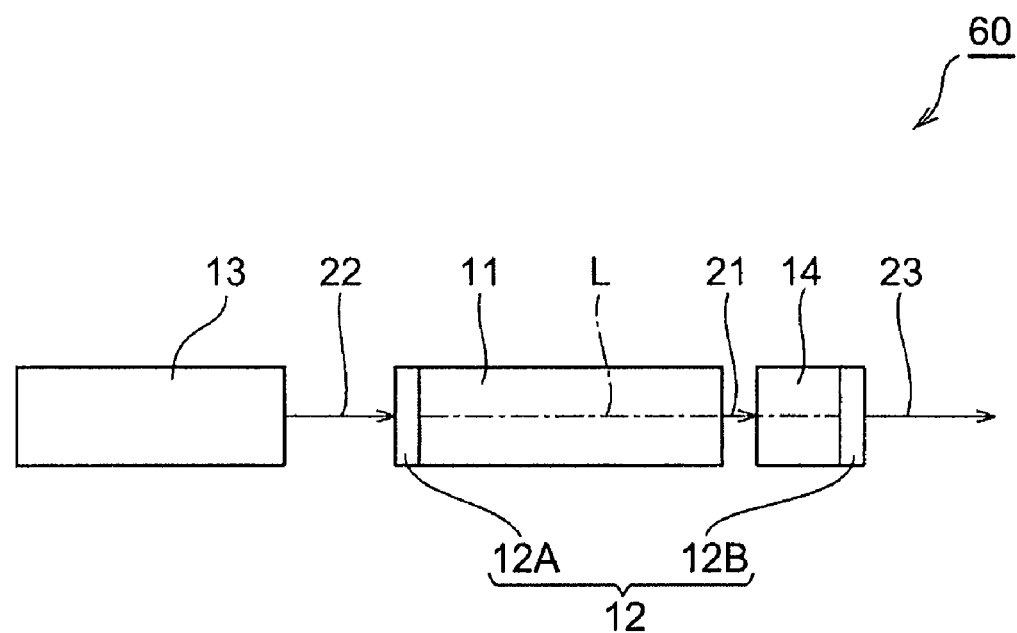
FIG. 14 is a schematic view showing the configuration of a passively Q-switched laser apparatus according to another embodiment of the present invention.

Further, although the $Cr^{4+}$:YAG crystal 14 as a saturable absorber and the mirror 12B are arranged separately in the laser apparatus 10, the mirror 12B may be arranged on an end face of the $Cr^{4+}$:YAG crystal 14 as in the laser apparatus 60 shown in FIG. 14. This allows the length of the optical resonator 12 in the optical axis L direction to be further reduced, which results in achieving size reduction. Then, the mirror 12B may be a dielectric multilayer film formed on an end face of the $Cr^{4+}$:YAG crystal 14 to achieve further size reduction.

Figure 15:
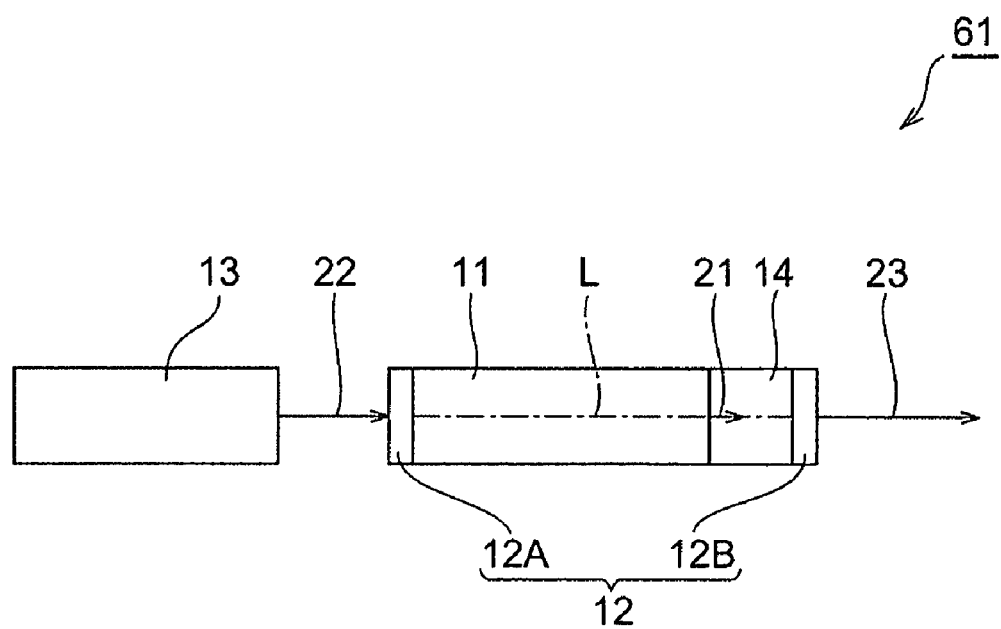
FIG. 15 is a schematic view showing the configuration of a passively Q-switched laser apparatus according to still another embodiment of the present invention.

Also, the Nd:YAG crystal 11 as a laser medium and the $Cr^{4+}$:YAG crystal 14 may be made composite while controlling the polarization direction and the mirrors 12A and 12B may be formed, respectively, on end faces of the $Nd^{3+}$:YAG crystal 11 and the $Cr^{4+}$:YAG crystal 14 as dielectric multilayer films, as in the laser apparatus 61 shown in FIG. 15. In this case, the laser apparatus 61 is a high-performance microchip laser that can output laser beams having a stabilized polarization direction.

Furthermore, the laser medium is not restricted to $Nd^{3+}$:YAG as long as it is capable of emitting light having a wavelength that can be absorbed by the saturable absorber.

INDUSTRIAL APPLICABILITY

The present invention is applicable to a passively Q-switched laser apparatus.

The invention claimed is:

1. A passively Q-switched laser apparatus comprising:
   a laser medium arranged between a pair of reflecting means that constitute an optical resonator and adapted to be excited to emit light;
   a saturable absorber arranged on an optical axis of said optical resonator between the pair of reflecting means, a transmissivity of the saturable absorber being adapted to increase with an absorption of light emitted from said laser medium; and
   an excitation light source unit adapted to output light having a wavelength that excites said laser medium, wherein
   said saturable absorber is a crystalline body having first to third mutually perpendicular crystallographic axes and is arranged in the optical resonator in such a manner as to have different transmissivities for light in two mutually perpendicular polarization directions emitted from said laser medium.

2. The passively Q-switched laser apparatus according to claim 1, wherein first and second angles $\theta$ and $\phi$ satisfy the following respective formulae (1) and (2), provided that $\theta$ represents an angle between said first crystallographic axis of said saturable absorber and said optical axis of said optical resonator, while $\phi$ represents an angle between a projection of the optical axis on the plane including said second and third crystallographic axes and said second crystallographic axis:

$$\pi/2(m-\xi) \leq \theta \leq \pi/2(m+\xi) \quad (1)$$

$$\pi/2(m+\xi+1/4) \leq \phi \leq \pi/2(m-\xi+3/4) \quad (2)$$

where m=0, 1, 2, 3, and
$\xi$ satisfies the following formula (3):

$$0 \leq \xi \leq 1/4 \quad (3).$$

3. The passively Q-switched laser apparatus according to claim 2, wherein
said first angle $\theta$ equals $\pi/2$ and said second angle $\phi$ equals $\pi/4$.

4. The passively Q-switched laser apparatus according to claim 1, wherein
said saturable absorber is made of $Cr^{4+}$:YAG crystal,
said first crystallographic axis is <001> axis,
said second crystallographic axis is <100> axis, and
said third crystallographic axis is <010> axis.

5. The passively Q-switched laser apparatus according to claim 1, wherein
said saturable absorber is made of $V^{4+}$:YAG crystal,
said first crystallographic axis is <001> axis,
said second crystallographic axis is <100> axis, and
said third crystallographic axis is <010> axis.

6. The passively Q-switched laser apparatus according to claim 1, wherein
said saturable absorber is made of GaAs.

7. The passively Q-switched laser apparatus according to claim 1,
wherein
said first crystallographic axis is <001> axis,
said second crystallographic axis is <100> axis, and
said third crystallographic axis is <010> axis, and
wherein first and second angles $\theta$ and $\phi$ satisfy the following respective formulae (1) and (2), provided that $\theta$ represents an angle between said first crystallographic axis of said saturable absorber and said optical axis of said optical resonator, while $\phi$ represents an angle between a projection of the optical axis on the plane including said second and third crystallographic axes and said second crystallographic axis:

$$\pi/2(m-\xi) \leq \theta \leq \pi/2(m+\xi) \quad (1)$$

$$\pi/2(m+\xi+1/4) \leq \phi \leq \pi/2(m-\xi+3/4) \quad (2)$$

where m=0, 1, 2, 3, and
$\xi$ satisfies the following formula (3):

$$0 \leq \xi \leq 1/4 \quad (3)$$

wherein said optical axis of said optical resonator is not parallel to one of the first to third crystallographic axes.

* * * * *